March 21, 1944.   C. S. RAMSEY   2,344,730
ARMY TANK
Filed June 20, 1941   2 Sheets-Sheet 1

Inventor
CARSON S. RAMSEY,
By Clarence A. O'Brien
Attorney

March 21, 1944.　　　C. S. RAMSEY　　　2,344,730

ARMY TANK

Filed June 20, 1941　　　2 Sheets-Sheet 2

Inventor

CARSON S. RAMSEY,

By (signature)

Attorney

Patented Mar. 21, 1944

2,344,730

UNITED STATES PATENT OFFICE 2,344,730

ARMY TANK

Carson S. Ramsey, Cureall, Mo.

Application June 20, 1941, Serial No. 399,037

1 Claim. (Cl. 180—9.2)

This invention relates to new and useful improvements in army tanks and more particularly to a small tank for auxiliary duty.

The principal object of the invention is to provide a small auxiliary tank adapted to contain a single occupant and provided with means whereby the single occupant can efficiently control the tank as well as a machine gun mounted thereon.

Another important object of the invention is to provide a one man tank of light construction and provided with a substantially turtle back shell for deflecting bullets and explosives.

Another important object of the invention is to provide a turtle back-shaped tank which can be parachuted from aeroplanes up-side-down so that the occupant and its machinery will be protected by its shell from ground fire.

Still a further object of the invention is to provide a small one man tank which can be conveniently dropped from aeroplanes for invading and taking over enemy airports.

These and various other important objects and advantages of the invention will become apparent to the reader of the following specification.

Figure 1:
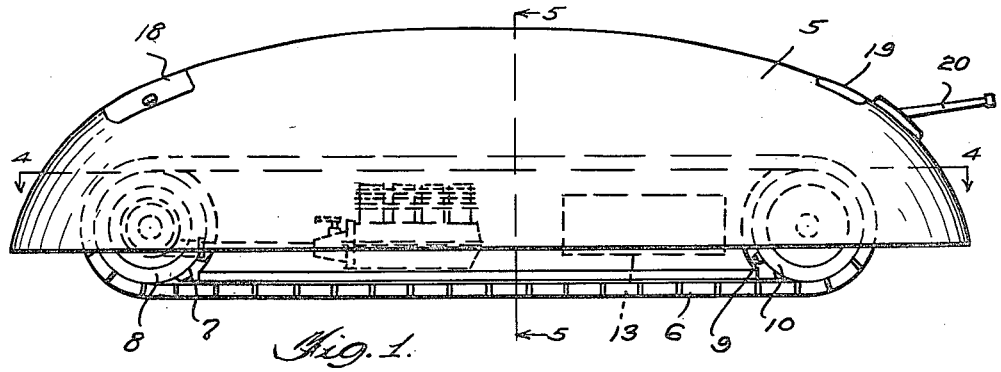
Figure 1 represents a side elevational view of the tank.
Figure 2:
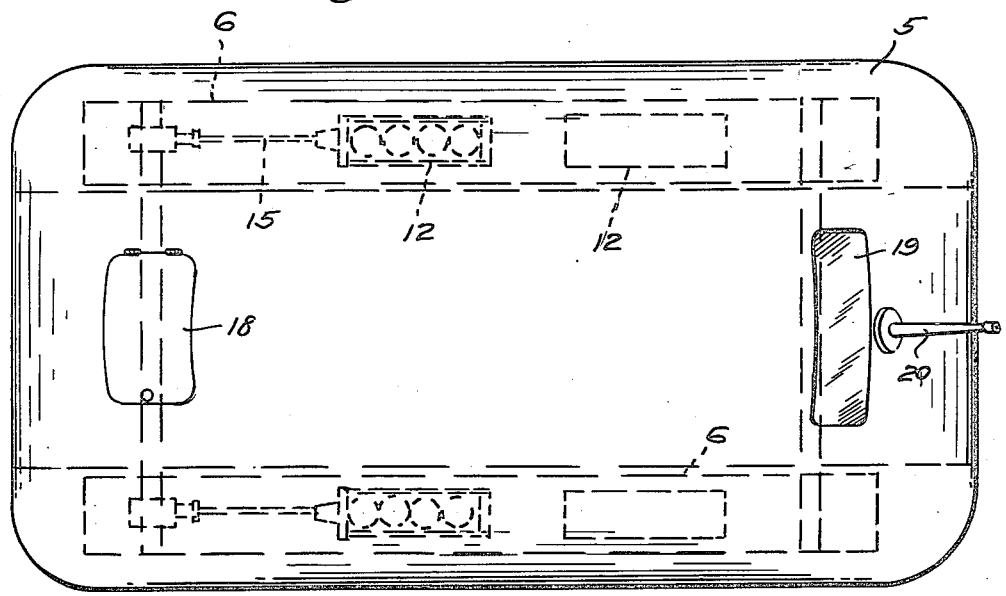
Figure 2 is a top plan view.
Figure 3:
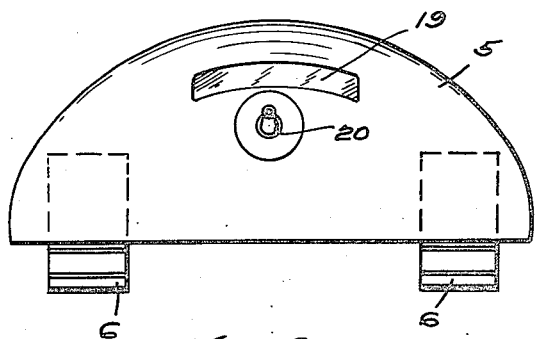
Figure 3 is a front elevational view.

Referring to the drawings wherein like numerals designate like parts, it can be seen that the tank includes a turtle back-shaped shell 5 which because of its shape and consequent deflecting ability may not be of extra thick steel.

The shell comes down over a pair of endless tracks 6 which are provided at the inner side with teeth meshing with the teeth 7 on drive wheels 8 and also on teeth 9 of idling wheels 10.

Figure 4:
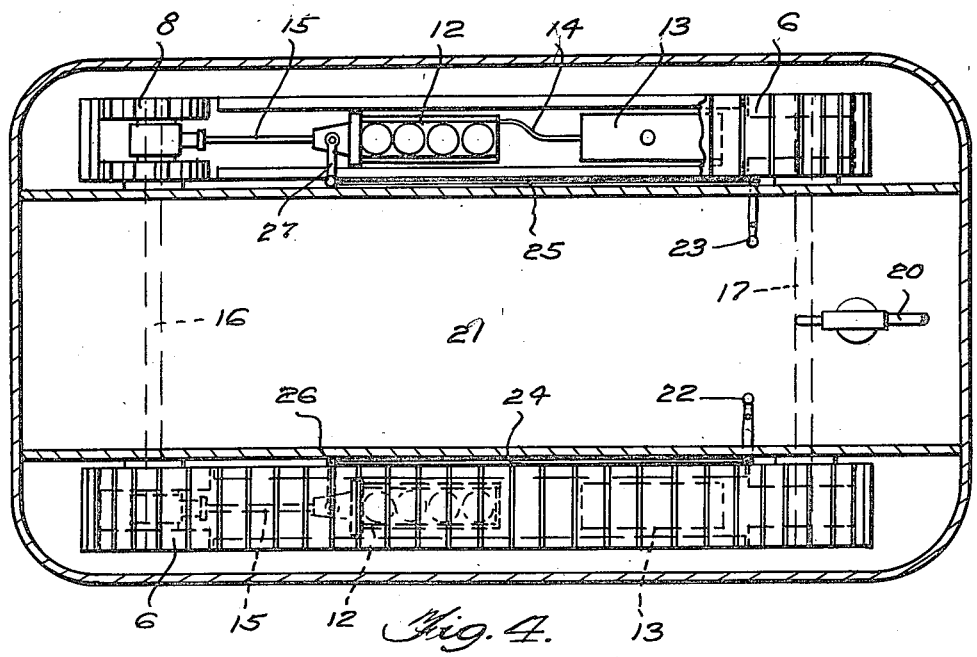
Figure 4 is a horizontal sectional view taken substantially on the line 4—4 of Figure 1.
Figure 5:
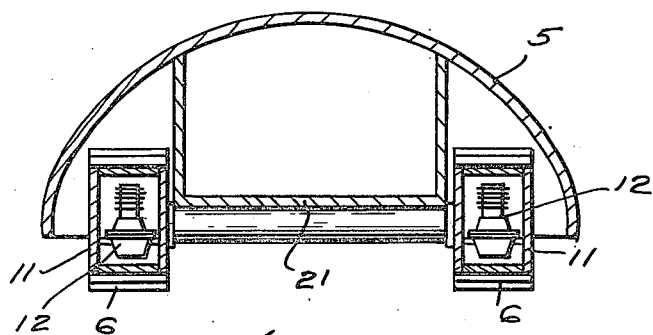
Figure 5 is a transverse sectional view taken substantially on the line 5—5 of Figure 1.

Within the confines of each of the tracks 6 is an armored box-like construction 11 in which is mounted a power plant 12 and a fuel reservoir 13. Each of the fuel reservoirs 13 has a feed line 14 to its corresponding power plant and each power plant 12 has the drive shaft 15 therefrom to the corresponding set of drive wheels 8 and as can be seen in Figure 4 axles 16 may extend between the sets of drive wheels 8 and an axle 17 for the idling sprockets 10.

A door is provided for the rear portion of the shell 5 and is denoted by numeral 18. A window 19 is provided for the forward portion of the shell 5 just above a gun 20 which protrudes from the shell.

The breech end of the gun terminates over the forward end of the floor 21 of the tank and in close proximity to a pair of levers 22, 23 which are operatively connected with rods 24, 25, respectively, which, in turn, are operatively connected with levers 26, 27. Obviously, the object is to have the occupant lying upon the floor 21 longitudinally of the tank, his hands coming to a point where they can easily grasp the levers 22, 23 to control either or the other of the two power plants when zig-zagging or making turns. His hands are both in position for prompt manipulation of the gun 20.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

An army tank comprising a turtle back shaped shell, a pair of endless side track units in opposite sides of said shell, respectively, a closed compartment for each unit, a power plant in each compartment, and means whereby the units may be controlled simultaneously or independently including a pair of levers extending inwardly of the shell from said units, respectively, adjacent the front of the shell, and control connections between said levers and said plants, respectively.

CARSON S. RAMSEY.